US012567254B2

(12) United States Patent
Bashkirov et al.

(10) Patent No.: US 12,567,254 B2
(45) Date of Patent: Mar. 3, 2026

(54) SYSTEMS AND METHODS FOR ANALYZING VIDEO DATA AND GENERATING SCORING DATA

(71) Applicant: Sony Interactive Entertainment Inc., Tokyo (JP)

(72) Inventors: Sergey Bashkirov, Novato, CA (US); Celeste Bean, San Francisco, CA (US); Sudha Krishnamurthy, Foster City, CA (US); Masanori Omote, Half Moon Bay, CA (US); Sagar Sudhakara, Los Angeles, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 307 days.

(21) Appl. No.: 18/346,623

(22) Filed: Jul. 3, 2023

(65) Prior Publication Data

US 2025/0014336 A1     Jan. 9, 2025

(51) Int. Cl.
  *G06V 20/40*          (2022.01)
  *G06F 40/40*          (2020.01)
  *G06V 10/774*         (2022.01)
(52) U.S. Cl.
  CPC .............. *G06V 20/41* (2022.01); *G06F 40/40* (2020.01); *G06V 10/774* (2022.01)
(58) Field of Classification Search
  None
  See application file for complete search history.

(56) References Cited

U.S. PATENT DOCUMENTS

| | | |
|---|---|---|
| 2017/0289617 A1 | 10/2017 | Song et al. |
| 2020/0275133 A1 | 8/2020 | Ni et al. |
| 2021/0011939 A1 | 1/2021 | Sardar et al. |
| 2023/0080056 A1* | 3/2023 | Ramesh .................. G06N 3/09 |
| | | 463/29 |

OTHER PUBLICATIONS

International Search Report dated Dec. 2, 2024 in International Application No. PCT/IB2024/056465.
Written Opinion dated Dec. 2, 2024 in International Application No. PCT/IB2024/056465.
Partial International Search Report dated Oct. 9, 2024 in International Application No. PCT/IB2024/056465.

* cited by examiner

*Primary Examiner* — Leon Flores
(74) *Attorney, Agent, or Firm* — Fish & Richardson P.C.

(57)          ABSTRACT

System, process and device configurations are provided for analyzing video data, such as electronic game data, and generating scoring data for video data. Processes and device configurations include training a video data analysis model to generate scoring parameters, and for an evaluation tool for video data. Highly viewed and popular videos may be used as training input to the video analysis model. At least one score parameter may be determined for scoring videos. For electronic games, at least one score may be associated with a game scene, gameplay storylines, and for scoring video data in general. Analysis of game titles and game design may be performed during design to ensure that game scenes will have a high likelihood of user interest. Embodiments may also include modifying gameplay and gameplay storylines, and evaluating game promotional videos.

20 Claims, 4 Drawing Sheets

300

400

500

600

SYSTEMS AND METHODS FOR ANALYZING VIDEO DATA AND GENERATING SCORING DATA

FIELD

The present disclosure is directed to video analysis, entertainment and electronic video gaming, including device operations, processes, and configurations for analyzing video data, analyzing electronic games, game evaluation, user interface control and control device configurations.

BACKGROUND

Computer and console games offer players different types of gaming experiences. Design of games and interactive content in general may be difficult to assess during development. Conventional methods of showing draft elements to a select group may not provide accurate review for an intended audience or audiences in general. In addition, it may be difficult to obtain a desired focus group. Promotional material for games and interactive content may also be difficult to assess prior to release. There exists a need and desire for tools to aide in assessing game and interactive content. There also exists a need and a desire for devices and processes that improve tool and machine operation for analyzing video content.

BRIEF SUMMARY OF THE EMBODIMENTS

Disclosed and described herein are systems, methods and configurations for analyzing video data and generating scoring data. In one embodiment, a method includes training, by a device, a video analysis model with a plurality of training input segments. Training includes generating at least one video analysis scoring parameter based on the plurality of training input segments. The method includes receiving, by a device, input video data, and determining, by the device, at least one video score parameter for the input video data. The at least one video score parameter is determined using the video analysis model. The method includes outputting, by the device, the at least one video score parameter.

In one embodiment, training includes controlling a learning model to process the plurality of training input segments and impression data for each training input segment, wherein the training input segments include video data.

In one embodiment, the input video data includes a rendered video segment for an electronic game title, and wherein the input video data is received as input to the video analysis model.

In one embodiment, the at least one video score parameter includes a popularity rating estimation for the input video data.

In one embodiment, determining the at least one video score parameter includes converting the input video data to a text stream representation, the text stream representation including a description of the input video data, and applying the at least one video analysis score parameter to the text stream representation.

In one embodiment, determining the at least one video score parameter includes performing a comparison of embedded input video data to a video input data reference.

In one embodiment, determining the at least one video score parameter includes identification of at least one tag word and preview image of input video data.

In one embodiment, outputting the at least one game scoring parameter includes controlling display of the at least one score parameter.

In one embodiment, outputting the at least one video scoring parameter includes identification of at least one element of the input video data associated with a low score.

In one embodiment, outputting the at least one video score parameter includes modifying the input video data.

Another embodiment is directed to a device configured for analyzing video data and generating scoring data. The device includes an interface, memory storing executable instructions, and a controller coupled to the interface and memory. The controller is configured to train a video analysis model with a plurality of training input segments. Training includes generating at least one video analysis scoring parameter based on the plurality of training input segments. The controller is configured to receive input video data and determine at least one video score parameter for the input video data, wherein the at least one video score parameter is determined using the video analysis model. The controller is configured to output the at least one video score parameter.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
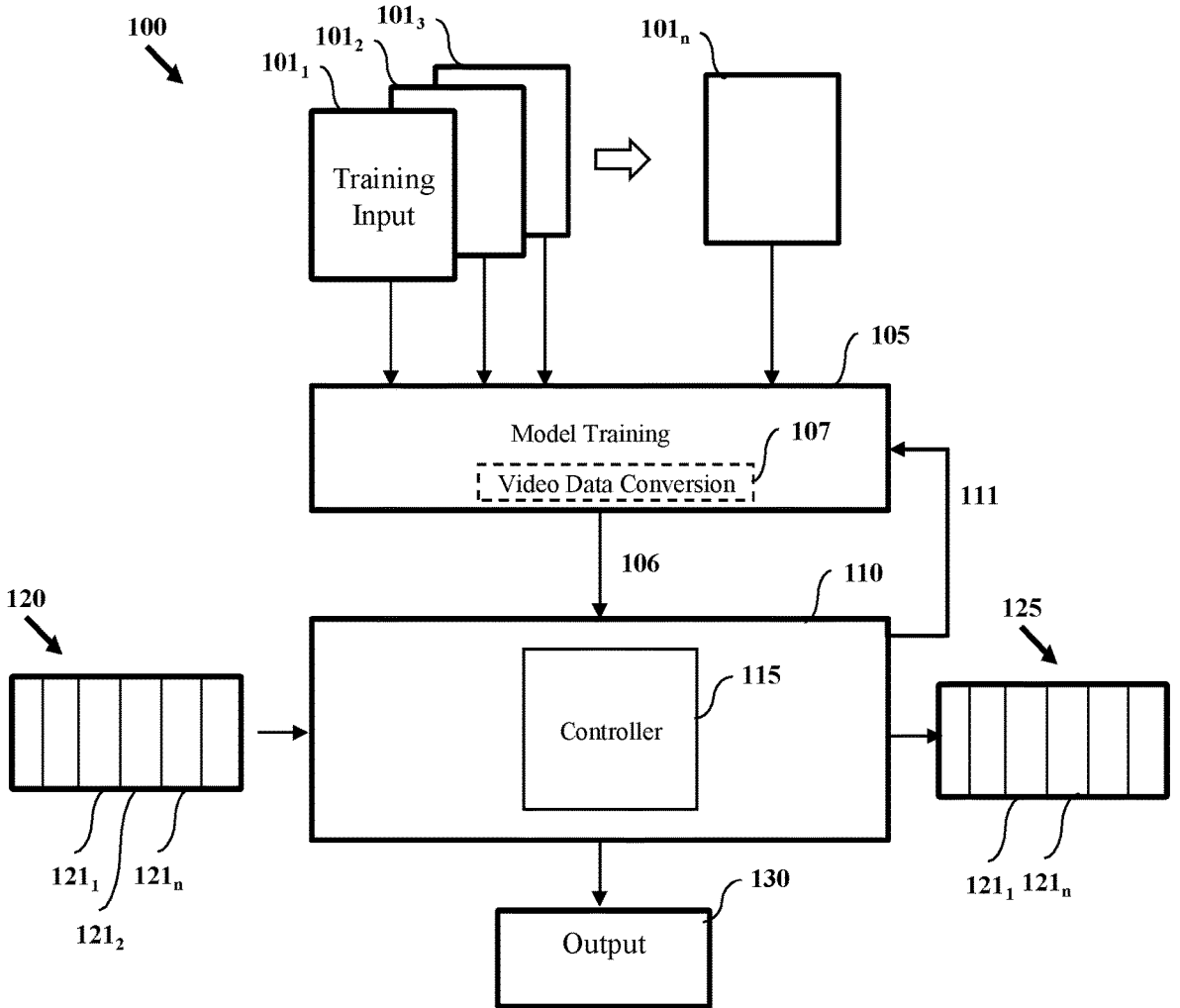
FIG. 1 is a graphical representation of analyzing video data and generating scoring data according to one or more embodiments.

One aspect of the disclosure is directed to dynamically analyzing video data and generating values, such as scoring data, to generate a measure or rating of content. Systems, devices and processes are configured for providing an automatic grading system and for assessment of video data, including but not limited to interactive media content, gaming content, game videos, movies and promotional material including videos or previews of gameplay. Embodiments may be used during game design to evaluate game scenes and game narrative. In addition, embodiments may provide tools for use during development of promotional material. Embodiments may leverage video data, such as popular videos or selected videos, to generate and refine machine models, including learning models. Embodiments include processes for embedding video content, operations for processing video content, and evaluation using identified and/or learned model parameters to generate one or more score parameters.

According to embodiments, processes and configurations are provided for analyzing video content and generating scoring data. These processes and device configurations can provide a tool to evaluate videos for electronic games, game media and gaming content. The processes and configurations may include a video data analysis model. The video data analysis model may be an interactive media content analysis model, configured for analysis of interactive content such as electronic gaming content. These models may be a machine learning model including one or more machine trainable parameters and operations. Processes can include training the interactive video data models with a plurality of training input segments. Training can generate at least one video scoring parameter based on the plurality of training input segments. According to embodiments, game video data for an electronic game may be received and at least one score parameter for the game video data may be determined using the video data analysis model. The score parameter may be output and/or used for modifying or altering game video data. Processes and operations discussed herein can be used to modify and/or edit gameplay videos, gameplay storylines, gameplay events, and game environments. In addition, processes and operations may be used to design gameplay media. By evaluating video and gameplay data using a scoring system, one or more of gameplay and promotional material for games may be modified and/or edited to ensure the content provides user appeal.

According to embodiments, processes and operations may be configured to leverage popular video content. By way of example, embodiments may use popular or highly viewed content, such as viral videos, as a source of training material for a video data analysis model. Using highly popular video data, such as viral videos and videos with high downloads, one or more training and analysis parameters may be determined. According to embodiments, model training may be based on video content with and without video rating information. Using popular, highly impressioned or highly viewed video data can allow for using a large dataset of video content that includes one or more features that attract large audiences. As used herein, video data analysis models may be an interactive media content analysis model.

According to embodiments, processes and operations may be configured to perform video data set mining and game storyline evaluation. Interactive media content analysis models may be configured to detect one or more formats or characteristics of video data and generate feedback for video content, gameplay content and/or promotional content. By way of example, video content for popular videos may be associated with a sequence of events. For example, videos in a training set may have certain events, such as an introduction sequence for a duration lasting a first period of time, a middle sequence lasting a second period of time and an end sequence lasting a third period of time. The video data analysis model may identify events in gameplay videos and provide feedback on the events, event content, and event duration. Events may be evaluated based on scoring. In addition, content may be evaluated based on durations or storyline elements determined from training input sources.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1 is a graphical representation of analyzing video data, which many include interactive media content, or gaming videos, and generating scoring data according to one or more embodiments. According to embodiments, video data, such as online viral videos, junk videos and videos in general with high impressions may be used as training input to determine one or more characteristics for evaluating videos, electronic games and video media in general. Online viral videos and videos with large views can have millions of views and downloads. These videos and video channels can have huge audiences. It may often be the case that conventional methods of viewing and mining data from these videos may provide limited information. Embodiments are configured to received popular videos as input or datasets, and videos in general, to provide a scoring metric and tool for assessing video data, such as electronic gaming videos and electronic game promotional videos. Scores may be generated in order to assess gameplay, assist with game design and/or modify and edit video data. Embodiments are directed to training one or more models for evaluation of video content, including rendered game videos, portions of gameplay and game promotional materials, such as game trailers. Embodiments are also directed to configurations of tools that include one or more models and provide at least one of content evaluation, and content modification. FIG. 1 illustrates model training operations 105 and a device 110. According to embodiments, process 100 may be performed by device 110, such as a control device and/or one or more system components. According to embodiments, device 110 may be configured to perform model training operations 105. Model training operations 105 may be one or more executable instructions performed by controller 115 of device 110. According to embodiments, model training operations 105 may be performed as either part of and/or separate from scoring video data. In addition, training of model training operations 105 may be performed by one device, or multiple devices. Process 100 may also be performed by way of a communication network. Process 100 may include training an interactive media content analysis model and determining at least one score parameter for game video data.

Model training operations 105 of process 100 may include training a video data model, with a plurality of training segments, such as training input $101_{1-n}$. According to embodiments, a video data model may be an interactive media content analysis model and training input $101_{1-n}$ may include input media segments. One or more operations described herein with respect to a video data model may apply to interactive media content analysis models. According to embodiments, a video data analysis model includes a plurality of model parameters for one or more elements detected in training inputs. The video data model may be configured to create one or more vectors, or feature vectors, to represent numeric or symbolic characteristics of training input based on model parameters. In addition, the video data model may be a learning model using one or more of supervised and unsupervised feedback to improve detection of video features. According to embodiments, features detected in training input may be associated with score parameters. The model may generate a score for each training input based on detected features of the videos and vector representations of video data. The video data model may be stored as a computer executable function stored in non-transient memory and configured to receive input and generate a score for input based on trained features. Model training may be performed to create an abstraction of training input and representations of videos under assessment.

Model training at block 105 may include training of a learning model for one or more of discriminative and generative video analysis. Model training operations 105 may include training a model and/or function to generate scoring parameters, such as a video data scoring and media content scoring parameters, for video data segments. According to embodiments, model training operations 105 may generate output 106 including a model and one or more parameters and datasets for use by device 110.

According to embodiments, video data scoring parameters determined by model training operations 105 may include a sequence parameter including one or more attributes and characteristics for video content. The sequence parameter may identify actions occurring in the video data, identify sequences with high popularity and sequences with low popularity based on the training inputs. The sequence parameter may also identify combinations of sequences that have high popularity. Sequence parameters may also provide one or more story points or storyline arcs associated with video content. Video data scoring parameters determined by model training operations 105 may include identification of one or more tag words for video content. Tag words may be determined to describe one or more objects in a video segment. For game videos and game data, tag words may be determined to describe actions occurring in the segment, audio style, video style, colors, and locations. The tag words may be used to describe input training segments and provide a textual representation of input training content.

According to embodiments, training input sources may be selected based on a desired game style. By way of example, to evaluate a racing game or a racing scene for a game title, process 100 may include selection and use of training input $101_{1-n}$ for videos associated with racing. Alternatively, process 100 may select and use training input $101_{1-n}$ selected based on one or more of a design style and demographic (e.g., age, location, interest, etc.).

According to embodiments, model training at block 105 may include processing video data and training input for training a video data analysis model. Model training operations 105 may include conversion of video data including one or more video data conversion operations 107. Video data conversions 107 may include conversion of input training data to one or more vector representations. The vector representations may be arrays of real numbers of fixed length for storing object descriptions of one or more of video objects, story lines, scenes, and narrative descriptions of video content. Training may include generating one or more object or video scene descriptions of training inputs. Descriptions identified as parameters may be used as references or training data sets for comparison to media. According to embodiments, model training operations 105 may generate at least one media content scoring parameter based on the plurality of training input media segments.

Process 100 can include receiving training input $101_{1-n}$, which can include at least one training input video. According to embodiments, videos for training input $101_{1-n}$ may be selected. By way of example, training input may include a selection of popular videos, such as viral videos or videos with many likes and impressions. The videos, including video data and metadata (e.g., views, impressions, etc.), can be provided as input to model training operations 105 to determine one or more parameters and characteristics of highly viewed content. Parameters determined from training input $101_{1-n}$ can include storyline, or structure of presentation, order of objects presented, a formula for one or more actions in the video. Device 110 may be configured to provide feedback 111 for training an interactive media content analysis model.

Process 100 may provide automatic grading of video content and can provide a numerical estimation of predicted popularity and virality of videos and games. According to embodiments, process 100 may include receiving impression data for each segment of training input. Impression data including a number of views, downloads, shares, etc., can incorporated by model training operations 105 as weighting elements and/or metadata in training parameters of a model. According to embodiments, process 100 and model training operations may be configured to fit a model to training input $101_{1-n}$. According to embodiments a constrained model may be trained to learn extracting features from training input $101_{1-n}$, the model configured to produce low dimensional embeddings of input data and using the lower dimensional embedding as parameters to assess input video and generate a score for the input video. Training input $101_{1-n}$ can include examples of videos provided to the model and model parameters may be optimized by process 100 to optimize a score rating for input data across the training input. The score rating may be validated on a one or more subsets of data, such as a smaller subset of data, which may be different from training input. Process 100 can perform regularization of model parameters to decrease score prediction error of a validation dataset. Metadata for video data within training input $101_{1-n}$ can include number of views, average number of views per month, total number of likes, a likes/dislikes ratio, etc.

FIG. 1 illustrates device 100 including controller 115, with device 110 configured to receive game video data 120 for an electronic game. According to embodiments, game video data for one or more scenes of game play and/or promotional material such as a game trailer or game advertisement may be received by device 110 for analysis and generating scoring data. It should be appreciated that process 100, and embodiments discussed herein may be configured to generate scoring data for videos associated with a single game, video content for multiple game titles, and for scoring video data in general. By way of example, process 100 and device 110 can function as an evaluation tool for video data. With respect to game titles and game design, operations discussed herein may be performed during game design as a tool to ensure that game scenes will have a high likelihood of being favorable and liked by users. Operations may be deployed for gradually scoring gameplay videos of certain moments in a game. Embodiments may also allow for changing a game in such a way that the grading system gives it higher popularity scores. The scoring system may be used for game or movie trailers and also to modify the content and/or generate information for modification to improve scoring prior to release.

According to embodiments, process 100 includes device 110 performing video data set mining and game storyline evaluation. Interactive media content analysis models may be controlled by controller 115 to detect one or more formats or characteristics of video data and generate feedback for gameplay or promotional content. Controller 115 using an interactive media content analysis model may identify events in gameplay videos and provide feedback on the events, event content, and event duration. Events may be evaluated based on scoring. In addition, content may be evaluated based on durations or storyline elements determined from training input sources.

According to embodiments, process 100 may be performed by device 110, such as a gaming console, handheld gaming device, computer, tablet, mobile phone, etc. According to embodiments, device 110 may be a server configured to perform operations of process 100. Process 100 may be initiated when gaming content is received or initiated. Process 100 may be performed by control device 110, such as a gaming device, when game content is received.

According to embodiments, device 110 is configured to receive game video data 120 for an electronic game including one or more sets of frames $121_{1-n}$. Controller 120 may be configured determine at least one score parameter for game video data 120 using the interactive media content analysis model. Controller 115 may be configured to generate modified game video data 125. By way of example, controller 115 may rearrange one or more frames of video data, such that a set of frames may be removed or rearranged. FIG. 1 illustrates modification of sets of frames $121_{1-n}$ such that set of frames 1212 is removed. Controller 125 is configured to generate output 130 including at least one score parameter for the game video data. Output 130 may include output on a graphical user interface or display.

According to embodiments, output 130 and the at least one score parameter may be a value within a grading system. For example, the score parameter may be a numerical value, with lower values representing a lower estimate of obtaining high views and a higher number representing a higher estimate of obtaining high views. According to embodiments, score parameters may be based on one or more social affiliations of groups. By way of example, one or more of an age, location, subject of interest, game type and profile element in general may be used to score content. When scoring content includes conversion of video content to a text representation, scoring may be based on tag words and objects associated with input and training sources. According to embodiments, output 130 may be formatted as representation of the likelihood of being highly popular or not. For example, output 130 can include output of a discrimination function, such as +1 for video content estimated to be highly viewed and −1 for all other determinations.

Figure 2:
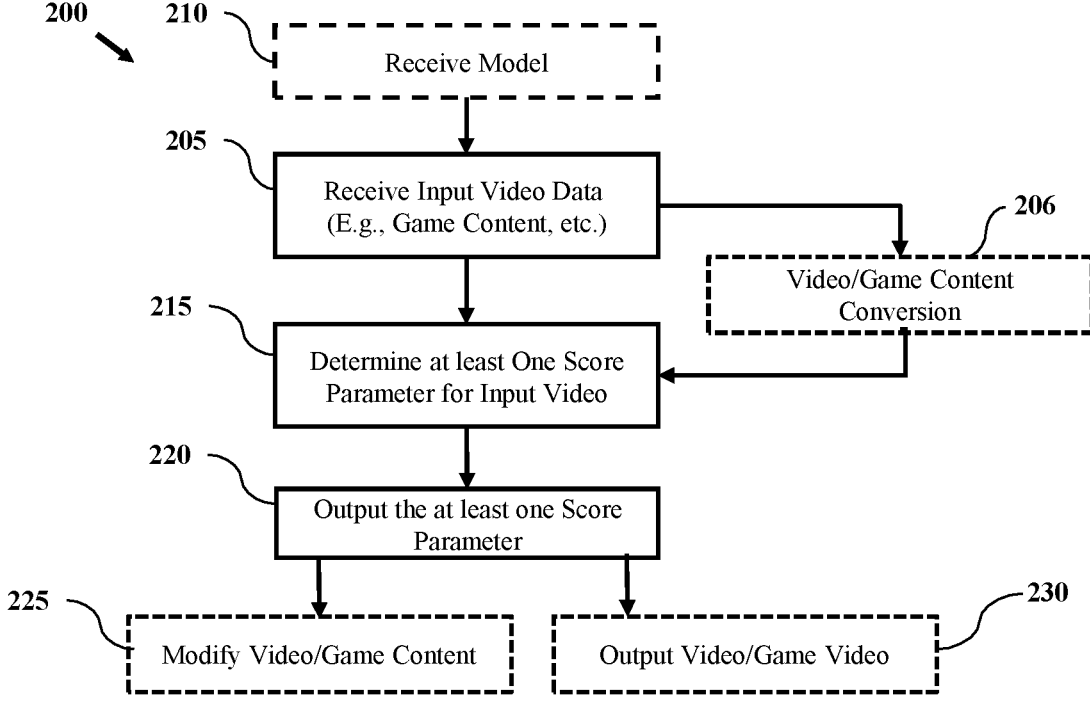
FIG. 2 illustrates a process for analyzing video data and generating scoring data according to one or more embodiments.

FIG. 2 illustrates a process for analyzing interactive media content and generating scoring data according to one or more embodiments. Process 200 may determine one or more score parameters for video data, such as game play videos and game title promotional trailers. According to embodiments, operations in process 200 are described for video game or electronic game data. However, it should be appreciated that the operations of process 200 may be applied to video data in general. Process 200 may be performed by a device, such as device 110, controller 115, device 300 or controller 305 of FIG. 3.

Process 200 may be initiated by a device receiving video data, such as game content, game video data for an electronic game, at block 205. Receiving game video data can include one or more rendered video segments for a game title. At block 205, process 200 can include using received game video data as input to a video data analysis model, such as an interactive media content analysis model. According to embodiments, a video data analysis model may be trained to score video data. Similarly, an interactive media content analysis model may be configured to score video data and may include one or more parameters for scoring interactive content, such as gaming content. Process 200 may optionally include receiving a model, such as a video data analysis model and/or an interactive media content analysis model at block 210. A model function and one or more training parameters can be received at block 210 for scoring game video data. According to embodiments, process 200 may include training an interactive media content analysis model at block 210 with a plurality of training input media segments to generate at least one media content scoring parameter based on the plurality of training input media segments. Training can include controlling a learning model to process the plurality of training input media segments and impression data for each segment, wherein the training input media segments include video data.

At block 215, process 200 can include determining at least one score parameter for video data, including determining at least one score parameter for game video data. The score parameter may be determined using the interactive media content analysis model and may be based on and/or include conversion the game video data to a text stream representation. The text stream representation can include a description of the game video data, and applying the at least one media content scoring parameter to the text stream representation.

Process 200 may optionally include a game content conversion at block 206. Game content conversion may include embedding video data into a format that may be applied to a model for determining scoring parameters. According to embodiments, video content may be converted to a textual representation of one or more words and objects describing the game video data, the segments of the game video, duration, objects in the video and characteristics of the objects.

Determining the at least one score parameter at block 215 can include performing a dot product operation on the game video data including comparing elements of the game video data to the at least one media content scoring parameter. The dot product operation may provide a value of similarity between identified training parameters and game content received as input. Determining the at least one score parameter includes identification of at least one tag word and preview image of game video data. The score parameter can include a popularity rating estimation for the game video data.

At block 220, process 200 can include outputting the at least one score parameter for the game video data. Outputting the at least one scoring parameter includes controlling display of the at least one scoring parameter. According to embodiments, outputting the at least one scoring parameter includes identification of at least one element of the game video data associated with a low score. Outputting the at least one scoring parameter can include identification of at least one element of the game video data associated with a low score.

Process 200 may optionally include modifying game content at block 225. According to embodiments, when a score determined for input game media is determined and the score is below a predetermined threshold, the model may be configured to identify one or more portions of the game video to delete or modify. For example, if a segment of the game video includes one or more frames with objects identified as reducing the score of the video the content may be removed at block 225.

Process 200 may optionally include outputting game video at block 230 based on one or more score parameters determined at block 230. By way of example, content may be modified based on the score and the edited content may be output at block 230.

Figure 3:
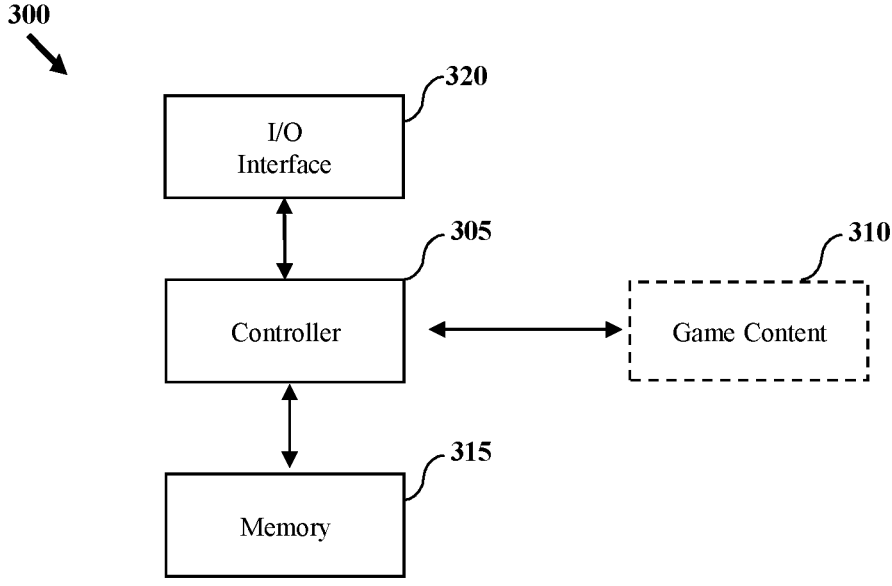
FIG. 3 illustrates a graphical representation of a device configuration according to one or more embodiments.

FIG. 3 illustrates a graphical representation of a device configuration according to one or more embodiments. Device 300 is configured for analyzing interactive media content and generating scoring data. Device 300 can represent a configuration for one or more components and functions of control device 110.

Device 300 may be a control device or game console device which can include controller 305, memory 315 and input/output (I/O) interface 320. Device 300 may represent one or more of a gaming console, computing device and electronic device in general configured to output one or more of video, audio and game data to an output device. Device 300 may also optionally include game content 310. Controller 305 may relate to a processor or control device configured to execute one or more operations stored in memory 315, such as processes for dynamically analyzing and modifying a game environment. Memory 315 may be non-transitory memory configured to provide data storage and working memory operations for device 300. Memory 315 may be configured to store computer readable instructions for execution by controller 305 for one or more processes described herein.

Device 300 may be configured to receive gaming media (e.g., card, cartridge, disk, etc.) storing game data and/or videos. Device 300 may also be configured to receive training data, such as one or more videos. Controller 305 may be configured to train an interactive media content analysis model with a plurality of training input media segments and generate at least one media content scoring parameter based on the plurality of training input media segments. Controller 305 can receive game video data for an electronic game and determine at least one score parameter for the game video data using the interactive media content analysis model. Controller 305 can also output the at least one score parameter for the game video data.

Figure 4:
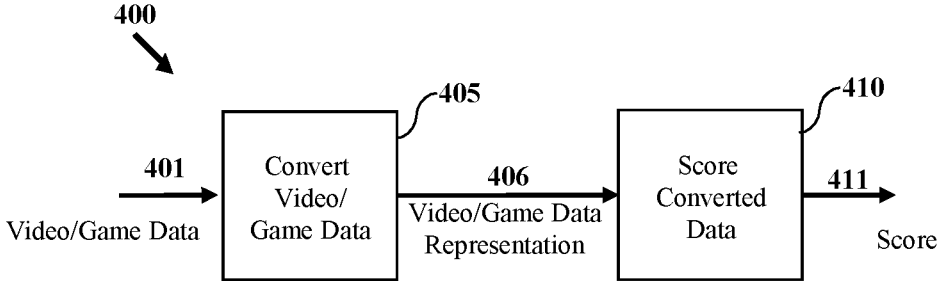
FIG. 4 illustrates a graphical representation of a process for analyzing video data and generating scoring data according to one or more embodiments.

FIG. 4 illustrates a graphical representation of a process for analyzing interactive media content and generating scoring data according to one or more embodiments. Process 400 may be performed by a device, such as device 300. Process 400 includes receiving game data 401 and converting game data at block 405. Receiving game data may include one or more segments of game video data, such as rendered gameplay, a game trailer, a gameplay visual, etc. Process 400 can convert game data at block 405 to a representation. According to embodiments, conversion of game data at block 405 may include conversion to a textual representation of one or more terms or words describing elements of the video data. For example, for a vehicle racing game and a video presenting car racing action, a game data representation can include an identification of the number of objects, the type of vehicle, color of the vehicle, a description of the race track and one or more graphical elements presented during the gameplay. Conversion of game data may also include a representation of the game storyline. For example, a description of the video may include terms to describe an introduction being a start of a race, an intermediary scene of vehicle racing and a final scene for racing results. Process 400 may generate textual representations for game data representation 406 to isolate a story line or events of the video from the graphical elements, such as graphical quality. At block 410, process 400 can include scoring game data representation 410 and generate output 411 including at least one score parameter for the game video data.

According to embodiments, process 400 may be performed by a device to generate one scores and score parameters for received game data. Process 400 may be performed for game video content of a game title under development. Process 400 may also be used for video content in general and may be used to assess game promotional material. According to embodiments, scoring converted data at block 410 may use one or more models (e.g., machine learning (ML) models) to extract one or more video parameters for analysis. Operations may identify one or more of visual, audio, and gameplay characteristics. Score parameters generated by process 400 may be used to evaluate generated video content for a game, including one or more of game storyline, likelihood of engagement.

According to embodiments, process 400 may be performed by a device to provide a function for evaluation of game content under design. A scene of gameplay, for example, may be provided as game data 401 and converted at block 405. At block 410, classification of the game data 406 can include identification of a portion of the gameplay that generates a low score. By way of example, an boss battle scene may be too long or include a scene duration resulting in a low score. Score data for game data 401 may be used to edit one or more of the entire game data 401 and/or a portion of the game data 401, such as part or all of the boss battle.

Figure 5:
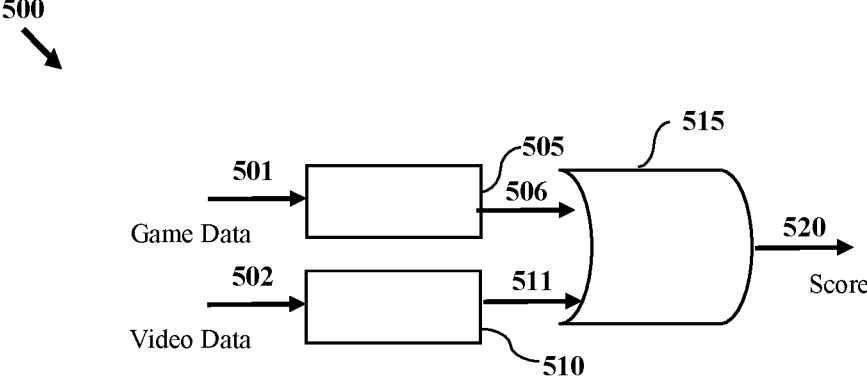
FIG. 5 illustrates a graphical representation of video data scoring according to one or more embodiments.

FIG. 5 illustrates a graphical representation of media content scoring according to one or more embodiments. Process 500 may be performed to evaluate game data, such as a game stream, game scene or game scenario (e.g., battle, race, etc.) against video data. Using video data that is highly interacted with may provide a game designer a tool to evaluate game content. Embodiments and process 500 allow for using selections of video content, such as particular videos or video types. Process 500 may be performed by a device, such as device 300. Process 500 includes receiving game data 501 and video data 502. According to embodiments, process 500 may allow for evaluation of game data and video data using an interactive media content analysis model.

Process 500 includes receiving game data 501, such as rendered video game data, a game stream, etc. and conversion of game data at block 505. Process 500 also includes receiving video data 502 which may be selected video data, or a particular style of video data, and conversion of the video data 502 at block 510. Conversion at blocks 505 and 510 may include conversion of video data and or embedding video data in a representation for evaluation by an interactive media content analysis model. Conversion at blocks 505 and 510 may be conversion to a semantic representation, such as a textual representation and/or vector representation. Converted game data 506 and converted video data 511 are output by blocks 505 and 510, respectively, and input to scoring block 515. According to embodiments scoring block 515 may be configured to compare vector representations of converted game data 506 and converted video data 511. Comparison at block 515 may be based on a dot product to determine a representation of similarity between converted game data 506 and converted video data 511. A score may be generated such that elements of game data having a higher similarity to the representation of video data may result in a higher score. Score 520 may be a numerical value, vector representation and/or data set including results parameters for comparison of game data 501 to video data 502.

According to embodiments, process 500 allows for selection and input of a video source or video data while using a model to evaluate both game data and the selected video source. By providing a designer a selected video source as a reference input, process 500 allows for evaluation of game design with one or more established videos and provides score 520 using a model applied to each input source. According to embodiments, process 500 includes receiving multiple user selections of video data 502, such as a video data input reference, for evaluation of game data against multiple video data sources. By way of example, a gameplay video for an auto racing game may be compared in process 500 to one or more of a video of actual car racing, rendered video data for a gameplay scene (e.g., of a different game, of a different level of the same game, of a different type of game). According to embodiments, a highly rated video stream may be used as video data 502 to compare gameplay video data of game data 501. By maximizing operations at block 515, such as the dot product, one or more trained features identified as providing a high likelihood of popularity may be similarly determined for game data 501.

Figure 6:
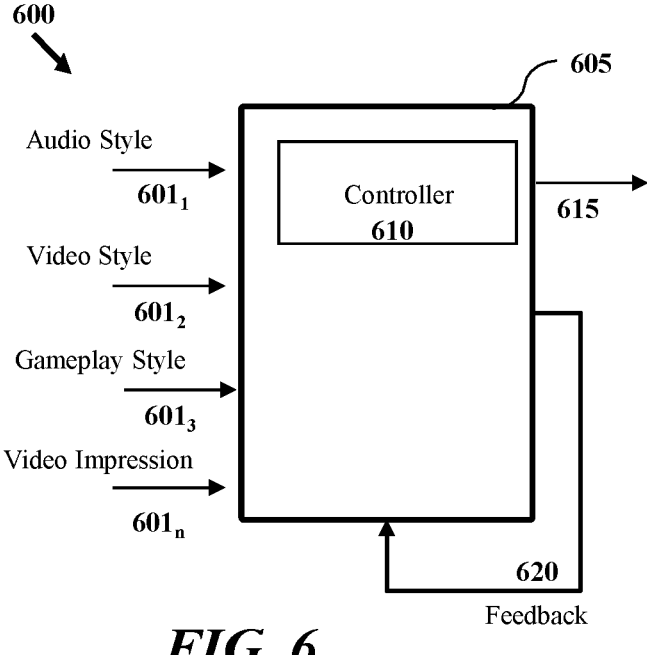
FIG. 6 illustrates a graphical representation of game specific training according to one or more embodiments.

FIG. 6 illustrates a graphical representation of game specific training according to one or more embodiments. According to embodiments, video parameters may be identified by an interactive media content analysis model using one or more references and models. Video data may be used to identify one or more parameters of popular video content. FIG. 6 illustrates training process 600 which can include determined video parameters $501_{1\text{-}n}$ as training input by a device 605 including a controller 610. According to embodiments, controller 610 may receive a plurality of videos as training input. In embodiments, video parameters $501_{1\text{-}n}$ may include determining characteristic including audio style 6011, video style 6012, gameplay style 6013 and video impression data $601_n$. Based on the training in process 600, controller 610 may generate output 615. Output 515 may include one or more score parameters, and model data for evaluation of game videos. According to embodiments, controller 610 may be configured to generate output 615 based on a recursive loop including training and feedback. Feedback loop 620 may provide information regarding accuracy of identified parameters.

According to embodiments, training process 600 and controller 610 may be configured to use one or more learning models (e.g., artificial intelligence, iterative models, etc.) to determine characteristics of video content and determine score parameters. Training process 600 and controller 610 may use one or more libraries for object identification and object to text embedding. According to embodiments, process 600 may be performed for training an interactive media content analysis model to identify one or more segments of game content for modification. Process 600 may determine a learning model for generating content scores and one or more parameters for characterizing video content.

While this disclosure has been particularly shown and described with references to exemplary embodiments thereof, it will be understood by those skilled in the art that various changes in form and details may be made therein without departing from the scope of the claimed embodiments.

What is claimed is:

1. A method for analyzing video data and generating scoring data, the method comprising:
   receiving, by a device, input video data;
   providing, by the device, the input video data as input to a video analysis model that is trained to generate video analysis score parameters;
   obtaining, as output from the video analysis model, at least one video analysis score parameter for the input video data;
   and
   modifying, by the device, the input video data based on the at least one video analysis score parameter to generate modified video data, the modifying including removing or rearranging at least one frame of the input video data.

2. The method of claim 1, wherein the input video data includes a rendered video segment for an electronic game.

3. The method of claim 1, wherein the at least one video analysis score parameter is related to a likely popularity rating of the input video data.

4. The method of claim 3, wherein modifying the input video data is responsive to determining that the likely popularity rating of the input video data does not satisfy a threshold popularity rating.

5. The method of claim 1, comprising:
   converting the input video data to a text stream representation, the text stream representation including a description of the input video data, and
   providing the text stream representation of the input video data as input to the video analysis model to obtain the at least one video analysis score parameter.

6. The method of claim 1, wherein the video analysis model is trained to generate the video analysis score parameters at least in part by comparing the input video data to a video input data reference.

7. The method of claim 1, comprising obtaining, as output from the video analysis model, at least one tag word and a preview image of input video data.

8. The method of claim 1, comprising providing the at least one video analysis score parameter for display.

9. The method of claim 1, comprising:
   determining that the at least one video analysis score parameter does not satisfy a predetermined threshold; and
   obtaining, as output from the video analysis model, information identifying at least one element of the input video data as a cause of the at least one video score parameter not satisfying the predetermined threshold.

10. The method of claim 9, wherein modifying the input video data comprises removing at least one frame of the input video data that is associated with the at least one element of the input video data identified as a cause of the at least one video score parameter not satisfying the predetermined threshold.

11. The method of claim 1, wherein modifying the input video data comprises removing at least one frame of the input video data.

12. The method of claim 1, wherein modifying the input video data comprises rearranging at least one frame of the input video data.

13. A device configured for analyzing video data and generating scoring data, the device comprising:
   an interface;
   a memory storing executable instructions; and

US 12,567,254 B2

13 a controller coupled to the interface and the memory, wherein the controller is configured to perform operations comprising:

receiving input video data;

providing the input video data as input to a video analysis model that is trained to generate video analysis score parameters;

obtaining, as output from the video analysis model, at least one video analysis score parameter for the input video data;

and modifying the input video based on the at least one video analysis score parameter to generate modified video data, the modifying including removing or rearranging at least one frame of the input video data.

14. The device of claim 13, wherein the input video data includes a rendered video segment for a game.

15. The device of claim 13, wherein the at least one video analysis score parameter is related to a likely popularity of the input video data.

16. The device of claim 13, comprising:

converting the input video data to a text stream representation, the text stream representation including a description of the input video data, and providing the text stream representation of the input video data as input to the video analysis model to obtain the at least one video analysis score parameter.

17. The device of claim 13, wherein the video analysis model is trained to generate the video analysis score parameters at least in part by comparing the input video data to a video input data reference.

18. The device of claim 13, comprising obtaining, as output from the video analysis model, at least one tag word and a preview image of input video data.

19. The device of claim 13, comprising providing the at least one video analysis score parameter for display.

20. The device of claim 13, comprising obtaining, as output from the video analysis model, information identifying at least one element of the input video data associated with a low score.

*   *   *   *   *